April 22, 1952  S. D. ALLEY ET AL  2,593,516
DISTRIBUTOR
Filed April 30, 1948  2 SHEETS—SHEET 1
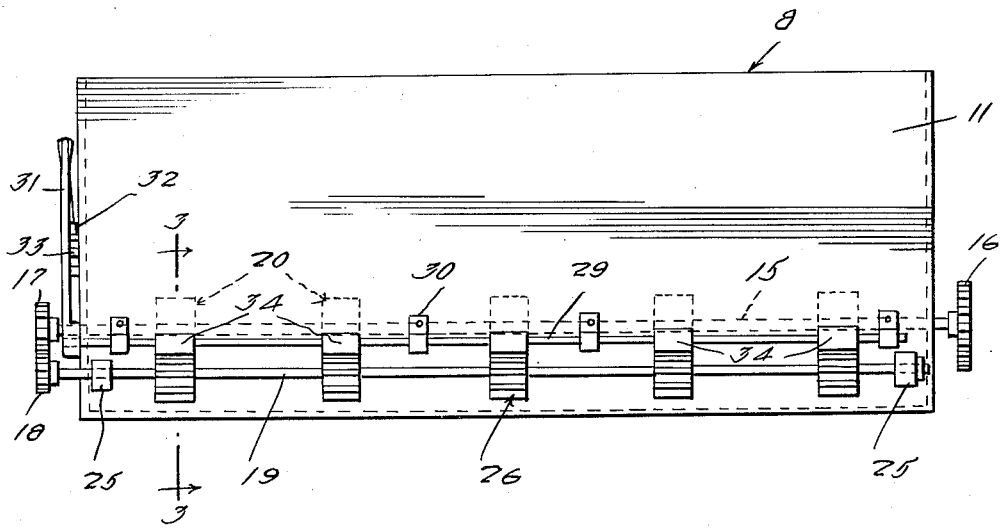
Fig. 1.
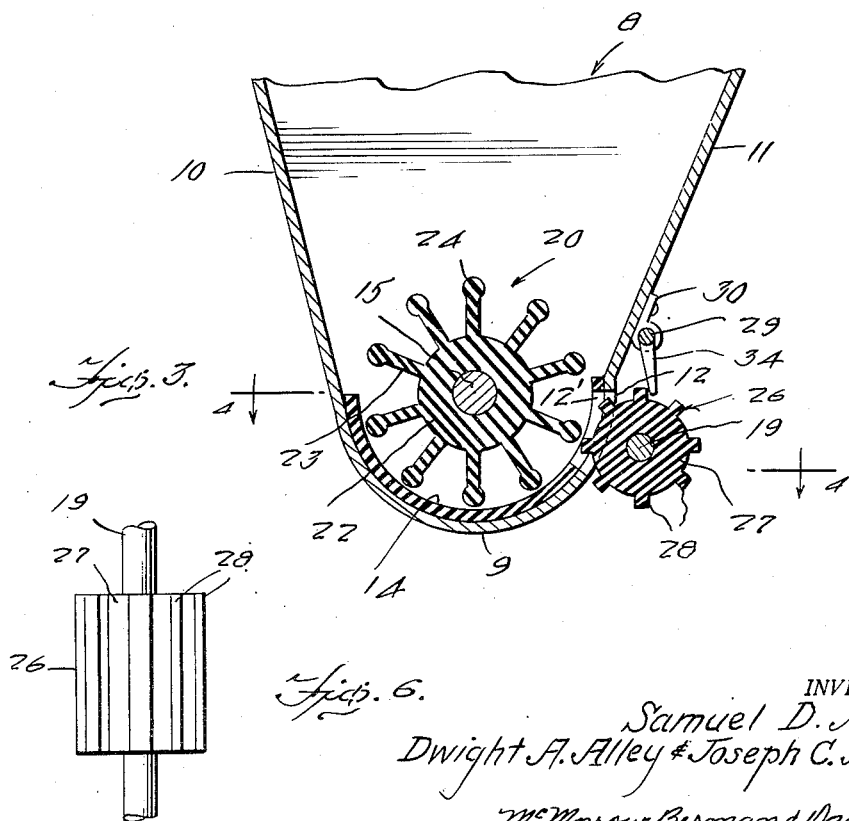
Fig. 3.
Fig. 6.
INVENTORS
Samuel D. Alley
Dwight A. Alley & Joseph C. Alley
McMorrow, Berman & Davidson
ATTORNEYS April 22, 1952  S. D. ALLEY ET AL  2,593,516
DISTRIBUTOR
Filed April 30, 1948  2 SHEETS—SHEET 2
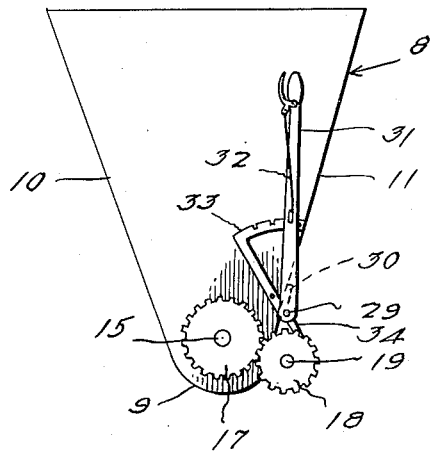
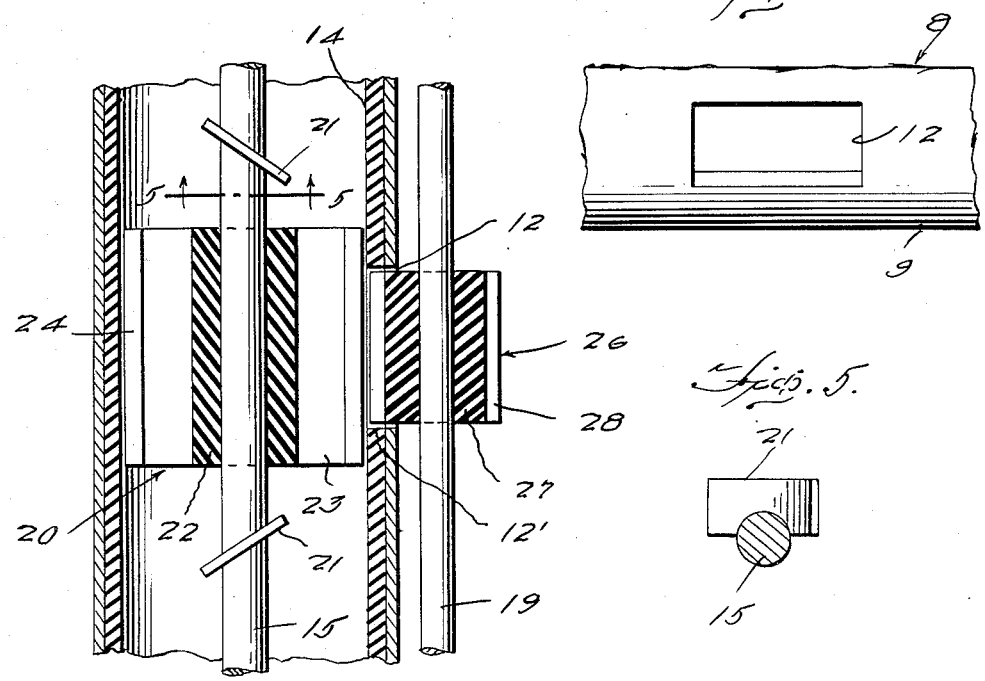
INVENTORS
Samuel D. Alley
Dwight A. Alley & Joseph C. Alley
McMorrow, Berman & Davidson
ATTORNEYS Patented Apr. 22, 1952

2,593,516

UNITED STATES PATENT OFFICE 2,593,516

DISTRIBUTOR

Samuel D. Alley, Waldron, and Joseph C. Alley and Dwight A. Alley, Anthony, Kans.

Application April 30, 1948, Serial No. 24,386

1 Claim. (Cl. 222—272)

This invention relates to an improved distributor for fertilizer material, seeds, and the like, the primary object of the invention being to provide a more durable and efficient device of this kind employing flexible and compressible feed rollers and cooperating parts formed of rubber, either natural or artificial or of similar flexible and compressible materials, having resistance to corrosion and rust and to which the fertilizer materials and the like will not cling or adhere.

Another important object of the invention is the provision of a device of the above indicated character employing a secondary feed roller in cooperative relation to the main feed roller, together with adjustable feed control flaps arranged to be adjusted relative to feed openings of the distributor hopper in which the secondary rollers operate, whereby discharge and distribution of the fertilizer material and/or seeds can be effectively and economically controlled.

Other important objects and advantageous features of the invention will be apparent from the following description and accompanying drawings, wherein, for purposes of illustration only, a specific embodiment of the invention is set forth in detail.

In the drawings:

Figure 1 is a rear elevation.

Figure 2 is a left hand end elevation.

Figure 3 is an enlarged fragmentary vertical section taken on the line 3—3 of Figure 1.

Figure 4 is a fragmentary horizontal section taken on the line 4—4 of Figure 3.

Figure 5 is a vertical section taken on the line 5—5 of Figure 4.

Figure 6 is a plan view of one of the secondary feed rollers, and

Figure 7 is a fragmentary rear elevation, showing one of the feed openings in the rear of the distributor hopper.

Referring in detail to the drawings, the herein illustrated form of improved distributor comprises a transversely elongated hopper 8 of inverted V-shaped cross-section having a semicircularly rounded bottom 9, a front wall 10, and a rear wall 11, the upper rear portion of the rounded bottom 9 being formed at transversely spaced intervals with a suitable number of feed openings 12 of transversely elongated rectangular shape. The hopper 8 is adapted to be mounted in any suitable manner on a tractor or other agricultural apparatus for carrying the device over the ground to be fertilized and/or planted with seed.

The rounded hopper bottom 9 is lined with a sponge rubber or other similarly compressible, acid resistant material in sheet form, the upper rear part of the liner 14 being formed with feeder openings 12' registered with the hopper feed openings 12, as shown in Figures 3 and 4.

Journalled in the hopper end walls concentrically with respect to the rounded bottom 9 is the main distributor or agitator shaft 15 having on one end outside the hopper a gear wheel 16 for connection to suitable drive or power means (not shown), and having on the opposite, in this case the left-hand end thereof, outside the hopper 8 a pinion 17, in mesh with a pinion 18 on the end of the secondary feed shaft 19. The main distributor shaft 15 has fixed thereon at spaced intervals corresponding to the positions of the feed openings 12, compressible and flexible material feed gears 20, with tangentially disposed flat agitator paddles 21 fixed to the shaft 15 therebetween in diagonal relation to the shaft, as shown in Figures 4 and 5.

The main feed gears 20 comprise relatively large diameter elongated hubs 22 from which similarly elongated flat, paddle-like spokes 23 radiate at equally spaced circumferated intervals, to run close to the compressible liner 14 in the rounded hopper bottom 9, as shown in Figure 3. The radially outward ends of the paddles or spokes 23 terminate in rounded heads 24 whose diameter is greater than the thickness of the paddles.

The secondary feed shaft 19 is journalled along the back wall of the hopper 8 on a line with the feed openings 12, in bearings 25 secured to the upper rear part of the rounded hopper bottom 9. The secondary feed rollers 26, which are fixed on the shaft 19 at and project into the feed openings 12 and 12', as shown in Figures 3 and 4, are made of flexible and compressible acid-resistant material like the main feed rollers 20. Each of the rollers 26 comprises a cylindrical body portion 27 concentric to the shaft 19, and relatively widely circumferentially-spaced longitudinal ribs 28 projecting from the body portion 27, in relatively closely spaced relation to the ends of the feed openings, as shown in Figure 4, and to the tops and bottoms of these openings, as shown in Figure 3, thereby for all practical purposes closing the feed openings.

An auxiliary control shaft 29 mounted across the back of the hopper 8 in journal bearings 30 secured to the rear wall 11, has a radial control hand lever 31 fixed to its left hand end, equipped with spring pressed dog means 32 cooperating with a toothed segment 33 mounted on the hopper 8, for holding the auxiliary shaft in a selected position of rotation. On the auxiliary control shaft 29, opposite each feed opening 12, is a fixed depending flap 34 which is positioned on the shaft 29 to engage the upper side of the secondary feed roller 26 between the ribs 28 when the shaft 29 is turned in a counterclockwise direction in Figure 3 from a position in which the flap 34 is elevated out of contact with the roller 26.

It will be obvious that with the main feed rollers 20 rotating in a counterclockwise direction, the material in the sphere of influence of the rollers 20 in the lower end 9 of the hopper will be agitated and rotated and a portion thereof moved upwardly toward and urged outwardly through the feed openings 12' and 12. Since the secondary feed rollers 26 are rotated in the clockwise or opposite direction from the main feed rollers 20 by reason of the geared connection of the shafts 15 and 19, and since the ribs or teeth 28 of the secondary rollers project into the feed openings 12 and 12', the material coming through these feed openings will be carried in an upward and outward direction through the upper ends of the openings by the ribs 28 and the body 27 of the rollers 26. The closeness of the rollers 26 to the upper ends of the openings limits and regulates discharge of material to fall to the ground, so that distribution of the material onto the ground is constantly at a rate dependent upon the condition of the material and the speed at which the feed rollers are operated. When this rate is considered excessive, the lever 31 controlling the shaft 29 may be shifted and set to bring the flaps 34 into engagement with the tops of the rollers 26 so as to restrict the flow of material moving through the upper ends of the openings and over the tops of the rollers 26. This restriction is produced by the blocking effect of the flaps 34, when engaged with the rollers 26, to the free movement of the stream of material from the upper ends of the feed openings and outwardly over the tops of the rollers 26. Further, because of the flexible nature of the rollers 26, the stationary flaps 34 act as abutments against which the ribs 28 on the rollers engage as the rollers 26 rotate, so that the following peripheral portions of the rollers 26 are retarded, with respect to other peripheral portions and are thereby bulged upwardly and inwardly, so as to partially close the upper ends of the feed openings, with consequent reduction of the flow of material therethrough.

What is claimed is:

In a fertilizer distributor including a horizontally disposed elongated hopper having a pair of downwardly converging side walls and a rounded bottom connecting said side walls together, said bottom being provided with a plurality of horizontally spaced discharge openings adjacent the juncture of said bottom with one of said side walls, a main longitudinally disposed rotary shaft mounted within said hopper adjacent the bottom thereof and adjacent said openings, a main roller secured to said shaft opposite each of said openings, a secondary rotary shaft arranged in parallel spaced relation with respect to said first named shaft and mounted exteriorly of said hopper adjacent said openings, a secondary resilient roller secured to said secondary shaft opposite each of said openings with a portion of the periphery of each projecting into the opening adjacent thereto to partially occlude the latter, means operatively connecting said main and secondary shafts together whereby said secondary rollers turn in an upward and outward direction with respect to the discharge openings so that discharge of the material takes place at the upper ends of the openings, a control shaft rotatably mounted above said secondary shaft in parallel spaced relation thereto, a flap secured to said control shaft opposite each of said openings and mounted for movement toward and away from engagement with the top of the adjacent secondary roller, lever means operatively connected to said control shaft to selectively rotate the latter, whereby said flap may be moved to a plurality of positions in contact with the tops of said secondary rollers and in partial blocking relation to the material emerging from the upper ends of the discharge openings to thereby control the rate of discharge of fertilizer from said rollers.

SAMUEL D. ALLEY.
DWIGHT A. ALLEY.
JOSEPH C. ALLEY.

REFERENCES CITED

The following references are of record in the file of this patent:

UNITED STATES PATENTS

| Number | Name | Date |
|---|---|---|
| 728,492 | Norris | May 19, 1903 |

FOREIGN PATENTS

| Number | Country | Date |
|---|---|---|
| 107,569 | Australia | June 19, 1936 |